(No Model.)

J. M. HEFNER.
HOE.

No. 394,692. Patented Dec. 18, 1888.

WITNESSES:
John W. Deemer
C. Sedgwick

INVENTOR:
J. M. Hefner,
BY Munn & Co.
ATTORNEYS.

UNITED STATES PATENT OFFICE.

JOHN M. HEFNER, OF MARIETTA, TEXAS.

HOE.

SPECIFICATION forming part of Letters Patent No. 394,692, dated December 18, 1888.

Application filed March 23, 1888. Serial No. 268,232. (No model.)

*To all whom it may concern:*

Be it known that I, JOHN M. HEFNER, of Marietta, in the county of Cass and State of Texas, have invented a new and useful Improvement in Hoes, of which the following is a full, clear, and exact description.

This invention more particularly relates to hoes for farmers' use, and will be found especially useful for cutting off sweet-potato vines from their beds, preparatory to plowing or digging to take the potatoes out of the ground, and it will here be described more especially to such use. It may, however, be used as a weeding-hoe for other purposes.

The hoe has its neck, which is curved and which virtually forms the vertical portion of the implement when being worked, made broad or deep and thin, with a substantially straight sharp cutting-edge, thus forming an upper thin independent blade of adequate strength and capable of being filed or sharpened from time to time, and which, when combined with the main blade of the hoe, makes the implement a practicable double-bladed one for the purposes for which it is intended, the cutting-edges of the two blades being in crosswise relation with each other. This construction essentially differs from a hoe having a thick curved shank of like depth and thickness throughout its length, excepting on its inner curved edge, which has been made V-shaped or sharp-edged to prevent soil, when using the hoe, from adhering to the neck, which purpose is not the object of my invention, as will be hereinafter explained.

Reference is to be had to the accompanying drawings, forming a part of this specification, in which similar letters of reference indicate corresponding parts in both figures.

Figure 1:
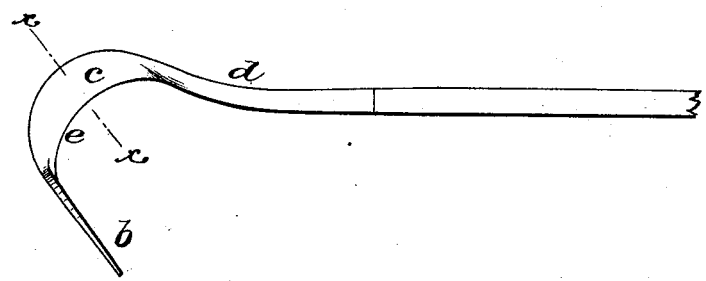
Figure 2:
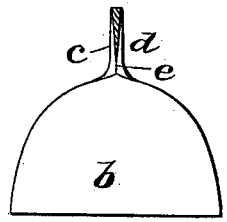

Figure 1 represents a side view of a hoe embodying my invention, with the handle partly broken away; and Fig. 2 is a section of the same upon the line $x$ $x$ in Fig. 1.

The main blade $b$ of the hoe may be made of the usual or any suitable shape, but preferably of tapering thickness. The neck $c$ of the curved shank $d$ is also made thin, so as to constitute an upper blade capable of being readily filed or sharpened, and is made to present a substantially sharp inner cutting-edge, $e$, in crosswise relation to the cutting-edge of the main blade $b$. To give the necessary strength and gradual taper or blade-like shape on its sides to the neck $c$, said neck is made of increased width or depth relatively to the rest of the shank to compensate for its diminution in thickness, and the cutting-edge of said neck or upper blade forms a gradual junction with the inner face of the main blade $b$.

In using this hoe on sweet-potato vines in the field, as hereinbefore referred to, vines running crosswise of the direction in which the stroke is made will run up the main blade $b$ and be cut by the upper blade, $c$, which practically will cut more vines than the lower blade, owing to so many vines running up to the neck, that with the ordinary hoe simply and objectionably hang onto the neck when using the hoe. The vines may thus be cut very fast, and, striking lengthwise with the row, just clipping the ground, the cut vines may afterward be buried or worked into the ground out of the way and the ground be much benefited.

Having thus described my invention, what I claim as new, and desire to secure by Letters Patent, is—

A hoe having two blades, the upper blade having a straight cutting-edge projecting from the top of the main blade at an obtuse angle to the inner face of the lower blade and entirely within the plane thereof, and the shank $d$, substantially as set forth.

JOHN M. HEFNER.

Witnesses:
JAMES M. WOMMACH,
JO. F. RILEY.